United States Patent Office 3,344,880
Patented Oct. 3, 1967

3,344,880
VOLTAGE OPERATED AUTOMATIC SPEED CONTROL SYSTEM FOR AUTOMOBILES
Noboru Iwashita, Okazaki-shi, and Kenji Ohno and Ikuya Kobayashi, Toyota-shi, Japan, assignors to Toyota Motor Company Limited, Toyota-shi, Japan, a corporation of Japan
Filed Nov. 24, 1964, Ser. No. 413,475
6 Claims. (Cl. 180—109)

The present invention relates to a generation-system automatic speed control device for automobiles. More particularly, the device of the present invention is directed to automatically carrying out the acceleration or slowing operation necessary for running an automobile at any desired, fixed speed; it employs a small-type AC generator for speed response, which maintains the motor of a throttle valve control means in the state of normal rotation, or reverse rotation, or stopping, by making two contacts ON-OFF properly upon applying the generated voltage to the control relay, so that speeds may be automatically controlled while also fixed-speed runs may be achieved.

Figure 1:
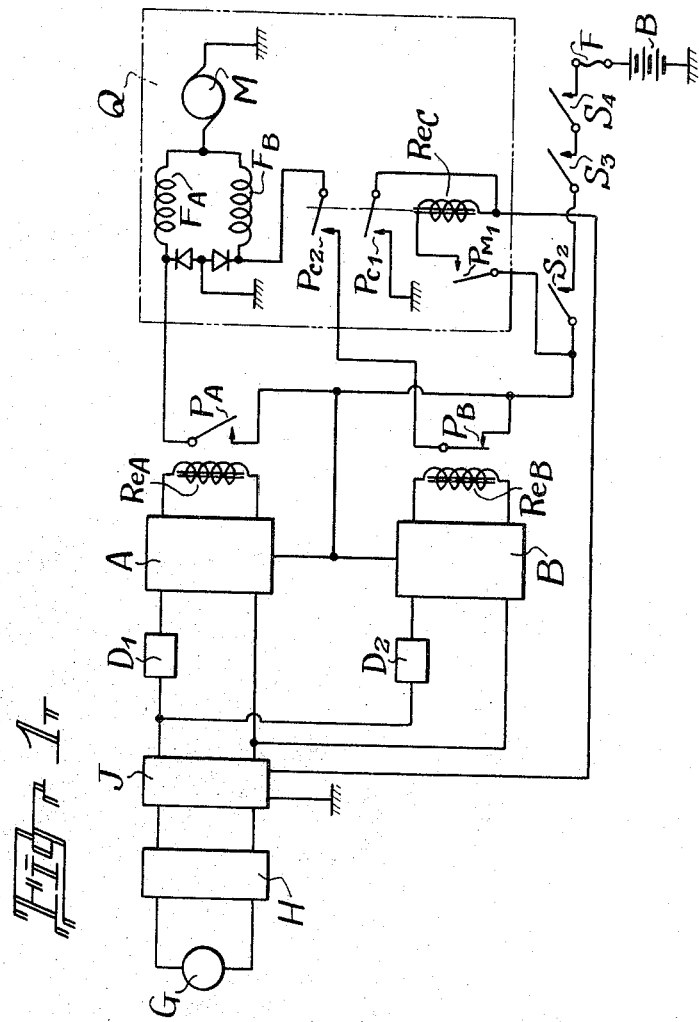
Figure 2:
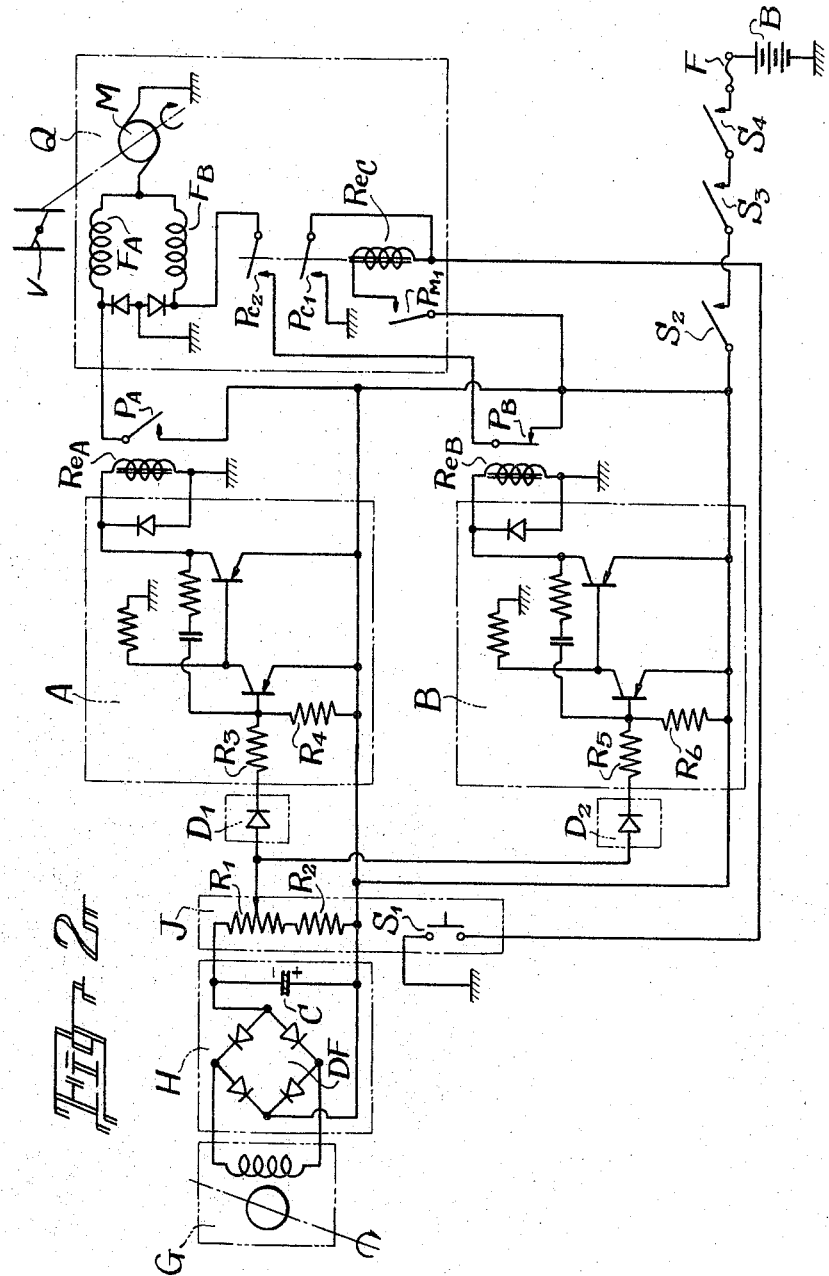

The present invention will be better understood and objects and advantages hereof will become apparent through the following description taken in connection with the drawings, in which:

FIG. 1 is a block diagram showing the operational relations of the elements of the system of the present invention; and FIG. 2 is a circuit diagram for the present invention.

Referring now more particularly to the accompanying drawings, the control switch J is composed of a speed-setting dial calibration plate (not shown), a variable resistor $R_1$ for regulating input voltage, an adjusting knob, and a push-button switch $S_1$ for operating the magnet relay $Re_C$, and is mounted on a meter panel. The speed-setting dial calibration plate is in a position connected with the tip of the left-pointing arrow which points from the diodes $D_1$ and $D_2$ to the control switch J. The AC generator G, driven by a gear or a speedometer cable drive gear, from the drive shaft of an automobile, is a small-type single-phase AC generator which generates voltages proportional to the speed of rotation of the drive shaft, and is mounted on the transmission case or in its vicinity being composed of a stator coil, a rotor (magnet), a driven gear and a case.

The control relay unit H is composed of: a rectifier $D_F$ and an electrolytic condenser C which rectify an AC voltage delivered from the generator G and convert it into a DC voltage; Zener diodes $D_1$ and $D_2$ which are conductive backward to an input voltage higher than a DC voltage corresponding to a speed set at the control switch J, switching transistor circuits A and B which turn ON-OFF by the said diodes; electro magnet relays $Re_A$ and $Re_B$; relay contacts $P_A$ and $P_B$.

The throttle valve control is connected mechanically to the accelerator link system through a rod and ball joint; and it is composed of: a throttle valve control arm which regulates the angular position of the carburetor throttle valve V by its rotation; a servo motor M which normally rotates, reversely rotates, or stops, depending upon the ON-OFF position of the contacts $P_A$ and $P_B$ of the control relays $Re_A$ and $Re_B$ and thus controls the operational angular position of the control arm; a mechanism which converts the rotary motion of the motor shaft into a reciprocating plane motion, a locking mechanism which is composed primarily of a magnet relay $Re_C$ for enabling automatically running at a fixed speed; relay controlled contact $P_{M1}$ which turns to ON mechanically when the throttle valve control arm is checked and becomes automatically speed-fixed; and self-locking contacts $Pc_1$ and $Pc_2$ for enabling the magnet relay $Re_C$ of the locking mechanism to be continuously energized by an electric current once the push-button switch $S_1$ is pushed in case the speed exceeds a set speed so that it may be possible to have a run automatically.

The release switch $P_{M1}$ turns the magnet relay $Re_C$ of the locking mechanism OFF upon an operation of the brake or clutch pedal during an automatic fixed-speed run, and is fitted to the operated position inter-locking with the operation of each brake for instituting an automatic run.

The operation of the present invention will be described with reference to FIG. 2. No signal current will pass into the switching circuits A and B, and thereby the relays $Re_A$ and $Re_B$ will not operate for the reason that a voltage applied to the Zener diodes $D_1$ and $D_2$ is lower than that of each Zener voltage in the case of running at less than a starting speed and a set speed. In other words, relay contact $P_A$ will be just OFF as it is and relay contact $P_B$ will be ON as it is. On the other hand, as the relay controlled contact $P_{M1}$ is also in the OFF position, no electric current will flow into the acceleration field coil of the servo motor M, and even though the push-button switch $S_1$ is pushed, the magnet relay $Re_C$ of the locking mechanism as well will not be actuated. In this condition, an automobile will be in exactly the same running condition as a common vehicle of the prior art which has not been equipped with the present device.

The voltage applied to the Zener diodes $D_1$ and $D_2$ in the case of running at higher than a set speed exceeds each Zener voltage, and therefore, both Zener diodes will be conductive, and the switching circuits and relays will be operative, that is, the contact $P_A$ of $Re_A$ will be ON and the contact $P_B$ of $Re_B$ will be OFF; a current will flow in the reduction field $F_A$ of the servo motor M; the control arm and acceleration link will be adjusted by reduction action, so that the accelerator pedal will receive reaction at the accelerator pedal, and then and therefore, the operator will come to know that the speed has been above a set speed, and automatic fixed-speed running will be possible. This accelerator pedal is connected by suitable means with the throttle valve control arm which is represented by the oblique dash line extending from valve V diametrically through motor M. On the other hand, as the contact $P_{M1}$ is already ON, the push-button $S_1$ of the control switch J (it is automatically self-restoring and is always OFF) is at once pushed to turn to ON, when an electric current will run into the magnet relay $Re_C$ of the locking mechanism, and the control arm (and therefore the acceleration link) is locked up by the servo motor at the same time the self-locking contact $Pc_1$ and $Pc_2$ of the magnet relay $Re_C$ will also be ON so that the locking mechanism may be completely operative so as to enter into the condition of automatically fixed-speed running.

In the case of automatically fixed-speed running, since the accelerator link system has been blocked and regulated by the servo motor, the operator can continue to run an automobile at a fixed speed with his foot off the accelerator pedal. That is to say, when a speed is above a set speed by $\alpha$ percent, the motor will operate for reduction action and will minimize the angular divergence of the throttle valve until the speed is lowered below a set speed and plus $\alpha$ percent, when the motor will stop. In other words, the throttle valve displacement will be maintained constant. On the other hand, when running resistance increases and the speed becomes lower than a set speed by more than $\alpha$ percent, the servo motor will cause an acceleration action, and when it attains a speed more than a set speed by minus $\alpha$ percent, the motor will stop. The speed is thus maintained constant at a plus-minus $\alpha$ percent of a set speed, regardless of the running resistance, as far permissible as possible by the engine horse power, and thus it may be possible to run automatically at a fixed speed.

To describe the circuit arrangement, the Zener diode $D_1$ on the reduction side of the control relay is employed in the form of one whose Zener voltage is higher than the Zener diode $D_2$ on the acceleration side, and since the circuit is so arranged that the voltage difference is more or less several Km./h. in terms of speed.

(1) In case the input voltage applied to the two diodes from the rectifier is larger than the Zener voltage of the Zener diode $D_1$, both Zener diodes $D_1$ and $D_2$ will be conductive; the contact $P_A$ is ON, the contact $P_B$ being OFF; an electric current passes into the reduction field coil $F_A$ of the servo motor M, thus a reduction action is brought about.

(2) In case the input voltage is smaller than the Zener voltage of the Zener diode $D_1$ and is larger than the Zener voltage of the Zener diode $D_2$, the diode $D_1$ will be in the OFF position and diode $D_2$ will be conductive; the relay contacts $P_A$ and $P_B$ both will be OFF; the servo motor M stops and continues to block the control arm and the acceleration link to lock to a certain operational position.

(3) In case the input voltage is smaller than the Zener voltage of the Zener diode $D_2$, both diodes $D_1$ and $D_2$ will be in the OFF position; as the relays $Re_A$ and $Re_B$ do not operate, the relay contact $P_A$ will be OFF and the relay contact $P_B$ will be ON; and electric current passes into the acceleration field coil $F_B$ of the servo motor M, thus an acceleration action is instituted.

The case of acceleration and speed reduction during an automatic fixed speed run will now be described.

As has been described, during an automatic fixed-speed run using the present invention, the acceleration link system is under the blocking control of the servo motor M and therefore it is possible for the operator to carry out acceleration or reduction by merely adjusting the variable resistor $R_1$ incorporated into the control switch J with his foot off the accelerator pedal, so that if and when the set speed indication is changed the adjusting action will operate so as to establish a speed to attain a new set speed.

For example, when the set speed is raised, the sliding contact of the variable resistor $R_1$ will go down (in other words, the voltage dividing ratio will increase) and the input voltage applied to the two Zener diodes $D_1$ and $D_2$ at the same speed will be diminished; the Zener diode $D_2$ that has been so far conductive (diode $D_1$ is already OFF in case the operating resistance is approximately constant) will be in the OFF position; the relay contact $P_B$ will turn from OFF to ON and the acceleration action of the servo motor will work so as to enlarge the angular position of the throttle valve until a new set speed is attained; and when the said set speed is achieved, the input voltage applied to the Zener diode $D_2$ will again exceed the Zener voltage; the diode $D_2$ will be conductive; the relay $Re_B$ will operate that the relay contact $P_B$ may be OFF and the servo motor M may stop.

In the case of reducing a speed by lowering a set speed, the sliding contact of the variable resistor $R_1$ will go upward and the voltage dividing ratio will decrease, thus resulting in that at the same speed the input voltage applied to the Zener diodes will increase and the Zener diode $D_1$ that has so far been in the OFF position will become conductive (the diode $D_2$ is already conductive); the relay contact $P_A$ will be ON so that the servo motor may cause a reduction action; when the angular divergence of the throttle valve is made smaller, the speed will come down to a new set speed, when the input voltage applied to the diode $D_1$ becomes below the Zener voltage, resulting thus in that the Zener diode $D_1$ will again be in the OFF position, and the relay contact $P_A$ will also be in OFF position so that the servo motor stops.

In the case where it is necessary to effect a sharp acceleration during an automatic fixed-speed run, it will suffice to make speed-setting indication values of the control switch the highest although it is possible for the operator to accelerate by pushing down the accelerator pedal just as in the case of ordinary operating vehicles. In this case, however, the speed will naturally exceed the set speed and the reduction action of the servo motor will operate so that the acceleration pedal receives a reaction.

There is a buffering tension spring necessary for the case where two opposing forces are applied to both sides, connected between the throttle control arm of the present invention coupled by means of the accelerator link and rod and the control plate on the servo motor side; when the operator pushes down the accelerator pedal for acceleration during an automatic run from the position where the operational position of the throttle valve control arm is blocked and regulated by the servo motor, a tension is applied to the said spring because the control plate on the motor side stays at a required position and the said tension gives the foot of the operator a resistance feeling as a reaction. The throttle valve control arm is represented in FIG. 2 by the dash line which extends from valve V obliquely diametrically through motor M.

The carburetor throttle valve V will be wide open upon pushing down the accelerator pedal against the said reaction, and a required acceleration may be obtained. Nevertheless, the blocking of the servo motor M is still effective in the meantime, and when the operator takes his foot off the acceleration pedal because of having no necessity of accelerating suddenly, the speed will rapidly go down to the initially set speed by the reduction action of the servo motor, and the car will continue again the automatic fixed-speed run at that speed.

As regards the spring, the mechanical structure is almost the same as with the known automatic speed control device. Here the spring is merely an addition in order to improve the understanding of the operational mechanism of the present device. Because of the fact that the changeover of the ON-OFF of the motor is done mechanically by the vertical movement of the governor weight in the conventional devices of the prior art, it is done in the case of the present invention by operating the magnet relay through causing ON-OFF action of the electric switching circuit; that is the only difference.

In the case where a brake or speed-change operation is carried out during an automatic fixed-speed run, when the brake pedal or clutch pedal is operated during an automatic fixed-speed run, the release switch $S_2$ or $S_3$ will operate so that the electric current of the magnet relay $Re_C$ of the locking mechanism is cut off, and the servo motor acceleration as well as the control against the throttle valve are released, thus the car is restored to its ordinary running condition.

This is because, in case the brake is applied, the carburetor throttle valve V will be wide open and the speed of the engine will become higher and higher thereby causing serious damage of the braking device and the engine, on account of the acceleration action of the servo motor, in order to restore the speed to the set speed unless the automatic speed control action is released.

Also in the case of turning the clutch off, the carburetor throttle valve V is regulated and maintains a cetrain angular position and therefore, the engine will be without load and turning at high speeds, there being thus caused damage, unless the locking mechanism of the present invention is released.

The most of conventional automatic speed control devices of the prior art have employed a mechanical governor as a speed responsive means, and their speed adjustment has been carried out by changing the compression load of the spring that pushes down the governor, employing a control wire. For this reason, the following troublesome conditions, are likely to take place during such operation.

(1) Swings of the speedometer pointer;
(2) The speedometer cable is likely to be damaged and, in case of damage, the meter will not indicate;
(3) Insufficient return of the control wire;
(4) The dial calibration of the control switch is likely to be non-uniform and the indication precision is not so good;
(5) The opening-closing contact of the field coil for the servo motor is opened and shut mechanically by the vertical movement of the governor, and therefore, to adjust the point gap is necessary, in addition to that it is easily subject to the influence of vibration;
(6) The arrangement of the speedometer cable and the control wire is difficult (the drawbacks from items (1) to (3) will be furthermore augmented if improper arrangement is made);

On the contrary, the following advantages will be obtainable in case the device of the present invention is utilized;

(1) The speed setting mechanism (control switch) has been made small and light; the dial calibration is uniform; indication values are precise. The control wire and its driving part are unnecessary, and the number of graduations of the variable resistor is enough to determine the desired number of speeds.

(2) The speed responsive mechanism operates by the generated voltage of a small-type AC generator and therefore there will be no influence of vibration, no swing of the speedometer pointer, and no concern about cable damage.

(3) The speed control mechanism operates by maintaining the motor in a state of normal rotation, reverse rotation or stopping, by means of the control relays composed of Zener diodes and transistor switching circuits, and is able to exactly control speeds over a wide range as far as the engine permits. And since the field coil contact of the motor is rotated electromagnetically to ON-OFF by the magnet relay, the speed control mechanism is free from the influence of gap regulation or vibration.

(4) As regards the size, weight and fitting of the apparatus, there will be no need of the control wire and speedometer cable (for the relay); regarding the throttle valve control, the governor mechanism will be entirely unnecessary so that, having been generally made smaller and lighter, there is no concern about the wiring arrangement of the control wire and meter cable. Consequently, in case the fitting of a generator has been taken into consideration at the time of designing of a vehicle, the finished vericle may be, as a whole, improved very considerably in its size, weight, and operation adjustment.

What is claimed is:

1. In an automatic speed control system for automobiles, a small alternating current generator connected to be driven by an automobile drive shaft, means for rectifying the output of said generator, voltage divider means for adjustably deriving a portion of the rectified output of said generator, a pair of Zener diodes having their inputs connected to said voltage divider means, a pair of transistor switching circuits having their inputs connected respectively to the outputs of said Zener diodes, a pair of output relays having their actuating windings connected respectively to the outputs of said transistor switching circuits, a servo motor connected to control the automobile throttle valve, a control relay having its actuating winding connected to the controlled contacts of said output relays, said control relay having a plurality of controlled contacts connected to the input of said servo motor, whereby said servo motor adjusts the throttle valve to adjust the speed of said drive shaft in desired manner.

2. A generation-system automatic speed control device for automobiles, comprising a reversible motor for controlling the opening of a throttle valve of said automobile, a first accelerating circuit for rotating said motor in a first direction, a first decelerating circuit for rotating said motor in the second reverse direction, an accelerating switch for energizing said first accelerating circuit, a decelerating switch for energizing said first decelerating circuit, an accelerating relay connected for opening said accelerating switch, a decelerating relay connected for closing said decelerating switch, a second accelerating circuit connected for energizing said accelerating switch, a second decelerating circuit connected for energizing said decelerating relay, an alternating current generator connected for energizing said second accelerating and decelerating switch circuits in said second rectifying means, and two Zener diodes, said generator being adapted to be driven by a propeller shaft of said automobile so as to generate an alternating voltage whose amplitude is in proportion to the speed of rotation of said shaft, said rectifying means being connected to rectify said alternating current so as to energize said relays with direct current, one of said two Zener diodes being inserted into said second accelerating circuit and adapted not to pass said direct current to said accelerating relay during the interval when said voltage amplitude of said direct current is lower than a Zener voltage inherent to the last-named Zener diode, and the other of said two Zener diodes being inserted into said second decelerating circuit and adapted to pass said direct current to said decelerating relay during the interval when said voltage amplitude of said direct current is higher than another Zener voltage inherent to the last-named Zener diode, whereby said opening of the throttle valve is broadened by lower speed rotation of said shaft and narrowed by higher speed rotation thereof than an intermediate speed rotation in which said voltage amplitude of said direct current lies between said two Zener voltages.

3. A generation-system automatic speed control device for automobiles, as claimed in claim 2, in which said accelerating switch is closed during the interval when said accelerating relay is not energized so as to rotate said reversible motor in said direction, and said decelerating switch is closed during the interval when said decelerating relay is energized so as to rotate said reversible motor in said reverse direction.

4. A generation-system automatic speed control device for automobiles, as claimed in claim 2, in which said voltage amplitude of said direct current is divided by means of a control switching means comprising a speed-setting dial calibration plate, a variable resistor, a knob for operating said variable resistor manually, and a push-button switch, so as to make said divided voltage amplitude correspond to said intermediate speed rotation in said second circuits in accordance with a set speed.

5. A generation-system automatic speed control device for automobiles, as claimed in claim 4, in which said push-button switch is adapted to engage said reversible motor with said throttle valve when said push-button is pushed conditional on having said pushing made when said automobile is at a higher speed than said set speed.

6. A generation-system automatic speed control device for automobiles, as claimed in claim 2, in which said first circuits are provided with opening means connected with a decelerating means for automobiles so as to open said circuits when a sudden decelerating operation is made.

References Cited
UNITED STATES PATENTS

| | | | |
|---|---|---|---|
| 3,042,836 | 7/1962 | Hamilton et al. | 180—82.1 X |
| 3,207,255 | 9/1965 | Hahlganss | 180—82.1 |
| 3,229,546 | 1/1966 | Nallinger et al. | 180—82.1 X |
| 3,230,442 | 1/1966 | Korda | 322—28 |
| 3,248,175 | 5/1966 | Baxter | 123—102 |

KENNETH H. BETTS, *Primary Examiner.*